US012316652B2

(12) United States Patent
Vajipayajula et al.

(10) Patent No.: US 12,316,652 B2
(45) Date of Patent: May 27, 2025

(54) INVOKING RESPONSE(S) BASED ON ANALYSIS OF A DATASET OBTAINED FROM SEARCHING A SECURITY ENDPOINT

(71) Applicant: International Business Machines Corporation, Armonk, NY (US)

(72) Inventors: Sulakshan Vajipayajula, Suwanee, GA (US); Paul Coccoli, Marietta, GA (US); Xiaokui Shu, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 17/864,270

(22) Filed: Jul. 13, 2022

(65) Prior Publication Data

US 2024/0022578 A1    Jan. 18, 2024

(51) Int. Cl.
*H04L 9/40*    (2022.01)

(52) U.S. Cl.
CPC ...... *H04L 63/1416* (2013.01); *H04L 63/1433* (2013.01); *H04L 63/145* (2013.01)

(58) Field of Classification Search
CPC ........................ H04L 63/1416; H04L 63/1433; H04L 63/145
See application file for complete search history.

(56) References Cited

U.S. PATENT DOCUMENTS

| | | | |
|---|---|---|---|
| 10,956,566 B2 | 3/2021 | Shu et al. | |
| 10,999,164 B1* | 5/2021 | Sridhar | H04L 63/0281 |
| 11,184,374 B2* | 11/2021 | Shu | G06F 21/554 |
| 11,262,742 B2 | 3/2022 | Srinivasamurthy et al. | |
| 11,516,069 B1* | 11/2022 | Satish | H04L 43/067 |
| 11,876,813 B2* | 1/2024 | Ithal | G06F 16/95 |
| 2014/0046978 A1* | 2/2014 | Krishnaprasad | G06F 16/2455 707/781 |
| 2018/0091528 A1* | 3/2018 | Shahbaz | G06F 21/53 |

(Continued)

OTHER PUBLICATIONS

HSS Cybersecurity Program, "The Evolution of Cyber Hunt Processes from IOCs to TTPs," HHS Cybersecurity Program presentation, Jun. 17, 2021, 26 pages.

(Continued)

*Primary Examiner* — Michael Won
(74) *Attorney, Agent, or Firm* — Zilka-Kotab, P.C.

(57) ABSTRACT

A computer-implemented method according to one embodiment includes causing a search to be performed for data on at least one security endpoint and organizing information about the performed search into steps and variables. Security analytics are run on a dataset provided from the performed search, and based on results of the analytics, a response is invoked to protect a system that interacts with the analyzed dataset. A computer program product according to another embodiment includes a computer readable storage medium having program instructions embodied therewith. The program instructions are readable and/or executable by a computer to cause the computer to perform the foregoing method. A system according to another embodiment includes a processor, and logic integrated with the processor, executable by the processor, or integrated with and executable by the processor. The logic is configured to perform the foregoing method.

25 Claims, 9 Drawing Sheets

(56) References Cited

U.S. PATENT DOCUMENTS

| | | | | |
|---|---|---|---|---|
| 2018/0113793 | A1* | 4/2018 | Fink | G06F 11/3624 |
| 2019/0052659 | A1* | 2/2019 | Weingarten | H04L 63/102 |
| 2019/0104138 | A1* | 4/2019 | Storms | H04L 63/1416 |
| 2019/0312899 | A1* | 10/2019 | Shulman | H04L 63/1416 |
| 2019/0317808 | A1* | 10/2019 | Srinivasan | H04L 67/12 |
| 2020/0120170 | A1* | 4/2020 | Amitay | G06Q 50/01 |
| 2020/0327223 | A1 | 10/2020 | Sanchez et al. | |
| 2021/0099490 | A1* | 4/2021 | Crabtree | H04L 63/20 |
| 2021/0194924 | A1* | 6/2021 | Heinemeyer | H04L 51/212 |
| 2021/0216630 | A1* | 7/2021 | Karr | H04L 63/1416 |
| 2021/0326467 | A1 | 10/2021 | Levy et al. | |
| 2021/0344576 | A1* | 11/2021 | Sridhar | H04L 41/0886 |
| 2021/0352099 | A1* | 11/2021 | Rogers | G06N 20/00 |
| 2022/0038468 | A1* | 2/2022 | Jeevagunta | H04L 63/1425 |
| 2023/0114821 | A1* | 4/2023 | Thomas | H04L 63/1441 726/23 |
| 2023/0179635 | A1* | 6/2023 | Schiel | H04L 63/20 726/23 |
| 2023/0262077 | A1* | 8/2023 | Palmer | H04L 63/0245 726/13 |
| 2023/0370491 | A1* | 11/2023 | Crabtree | G06N 3/098 |
| 2024/0054210 | A1* | 2/2024 | Kim | G06F 21/54 |

OTHER PUBLICATIONS

Alazab et al., "Federated Learning for Cybersecurity: Concepts, Challenges and Future Directions," IEEE Transactions on Industrial Informatics, Oct. 2021, 10 pages.

Bodeau et al., "Cyber Threat Modeling: Survey, Assessment, and Representative Framework," The Homeland Security Systems Engineering and Development Institute, Apr. 7, 2018, 119 pages.

Anonymous, "Count-based Access Control & Threat Protection for GraphQL APIs," IP.com Prior Art Database, Technical Disclosure No. IPCOM000269354D, Apr. 7, 2022, 4 pages.

Anonymous, "Method and system for behavioral threat detection," IP.com Prior Art Database, Technical Disclosure No. IPCOM000252175D, Dec. 20, 2017, 3 pages.

Anonymous, "Advanced Endpoint Security Advisor (AESA)," IP.com Prior Art Database, Technical Disclosure No. PCOM000250629D, Aug. 10, 2017, 5 pages.

Asghar et al., "Threat Mitigation in a Software Defined Network Environment," IP.com Prior Art Database, Technical Disclosure No. IPCOM000248564D, Dec. 19, 2016, 8 pages.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," National Institute of Standards and Technology, Information Technology Laboratory, Version 15, Oct. 7, 2009, pp. 1-2.

Mell et al., "The NIST Definition of Cloud Computing," Recommendations of the National Institute of Standards and Technology, Special Publication 800-145, Sep. 2011, pp. 1-7, retrieved from https://doi.org/10.6028/NIST.SP.800-145.

CSRC, "Cloud Computing," Computer Security Resource Center, Oct. 2017, 3 pages, retrieved from https://csrc.hist.gov/projects/cloud-computing.

Mell et al., "The NIST Definition of Cloud Computing," NIST Publications, Sep. 28, 2011, 2 pages, retrieved from https://www.nist.gov/publications/nist-definition-cloud-computing.

Grace Period Disclosure, "IBM Cloud Pak for Security 1.7.2 platform adds IBM Security Risk Manager, enabling data security teams to take prioritized remedial actions for identified risk areas; features enhanced threat management capabilities for finding and documenting anomalous behaviors," IBM Japan Software Announcement, Jul. 27, 2021, 22 pages.

Kestrel, "Language Specification," Kestrel, 2022, 22 pages, retieved from https://kestrel.readthedocs.io/en/latest/language.html#/kestrel-command.

* cited by examiner

INVOKING RESPONSE(S) BASED ON ANALYSIS OF A DATASET OBTAINED FROM SEARCHING A SECURITY ENDPOINT

STATEMENT REGARDING PRIOR DISCLOSURES BY THE INVENTOR OR A JOINT INVENTOR, OR ANOTHER WHO OBTAINED THE SUBJECT MATTER FROM AN INVENTOR OR JOINT INVENTOR

The following disclosure(s) are submitted under 35 U.S.C. 102(b)(1)(A): IBM Cloud Pak for Security 1.7.2 platform adds IBM Security Risk Manager, enabling data security teams to take prioritized remedial actions for identified risk areas; features enhanced threat management capabilities for finding and documenting anomalous behaviors, IBM Japan, Jul. 27, 2021.

BACKGROUND

The present invention relates to threat hunting, and more particularly, this invention relates to structured threat hunting on data gathered through a federated search on one or more security endpoints.

Threat hunting includes proactive actions typically performed by a program that is configured to search for potentially harmful behavior and/or actors within a network. Such proactive actions are typically performed based on the notion that the harmful behavior and/or actors may exist within the network despite active security parameters existing within the network. Various examples of such harmful behavior and/or actors include malicious actors within a network, risky network traffic, large data accesses, etc.

One or more components of a network remain vulnerable to the harmful behavior and/or actors until the harmful behavior and/or actors are addressed. This is problematic because the harmful behavior and/or actors are likely not noticeable until a threat hunt is performed to determine an existence of the actors. This potentially allows the harmful actors to operate undetected for prolonged periods of time within the network.

BRIEF SUMMARY

A computer-implemented method according to one embodiment includes causing a search to be performed for data on at least one security endpoint and organizing information about the performed search into steps and variables. Security analytics are run on a dataset provided from the performed search, and based on results of the analytics, a response is invoked to protect a system that interacts with the analyzed dataset.

A computer program product according to another embodiment includes a computer readable storage medium having program instructions embodied therewith. The program instructions are readable and/or executable by a computer to cause the computer to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
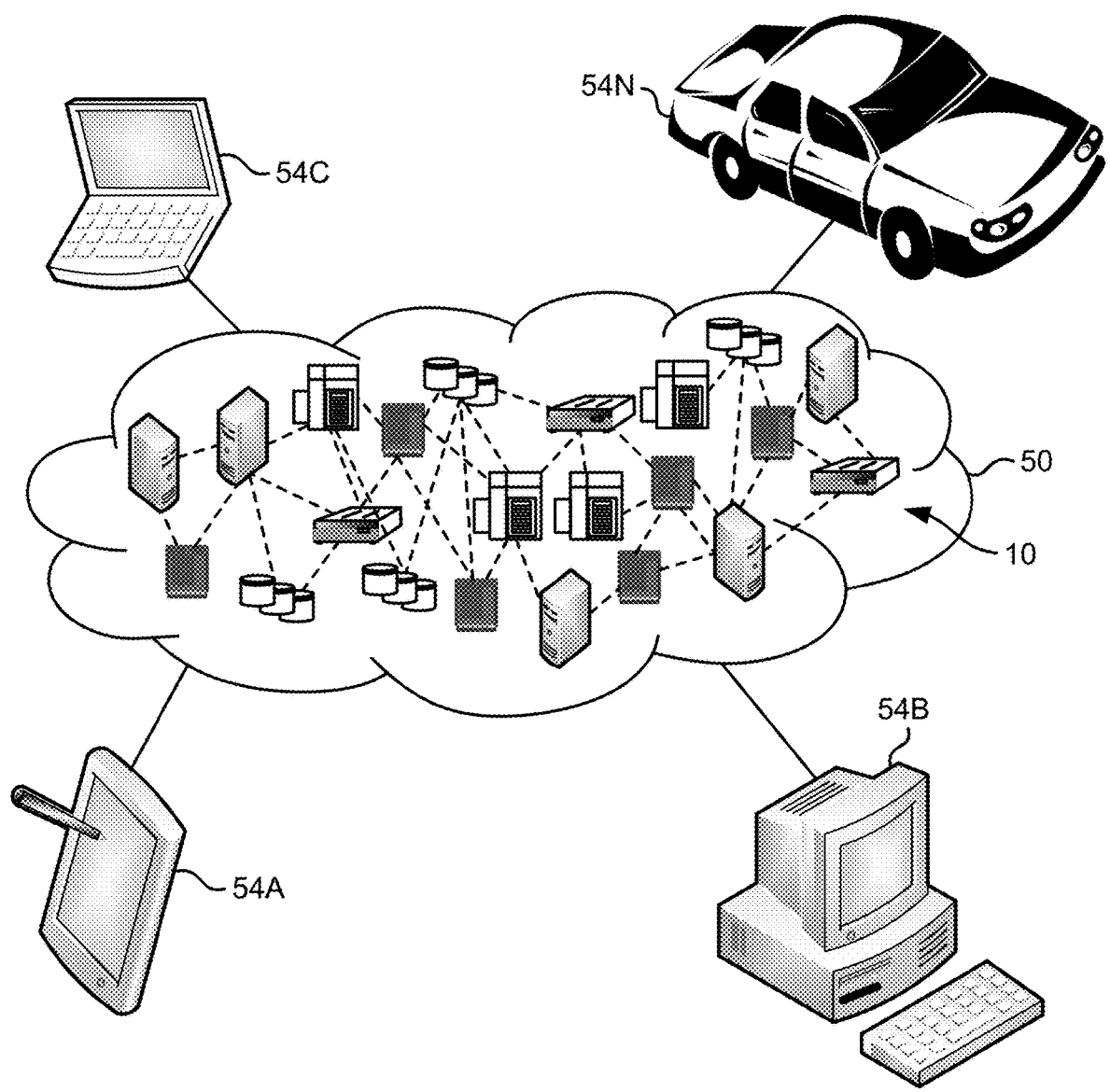
FIG. 1 depicts a cloud computing environment in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments for defining a sharable and reusable structured threat hunting template ("Hunt") using data gathered through a federated search on at least one security endpoint.

In one general embodiment, a computer-implemented method includes causing a search to be performed for data on at least one security endpoint and organizing information about the performed search into steps and variables. Security analytics are run on a dataset provided from the performed search, and based on results of the analytics, a response is invoked to protect a system that interacts with the analyzed dataset.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
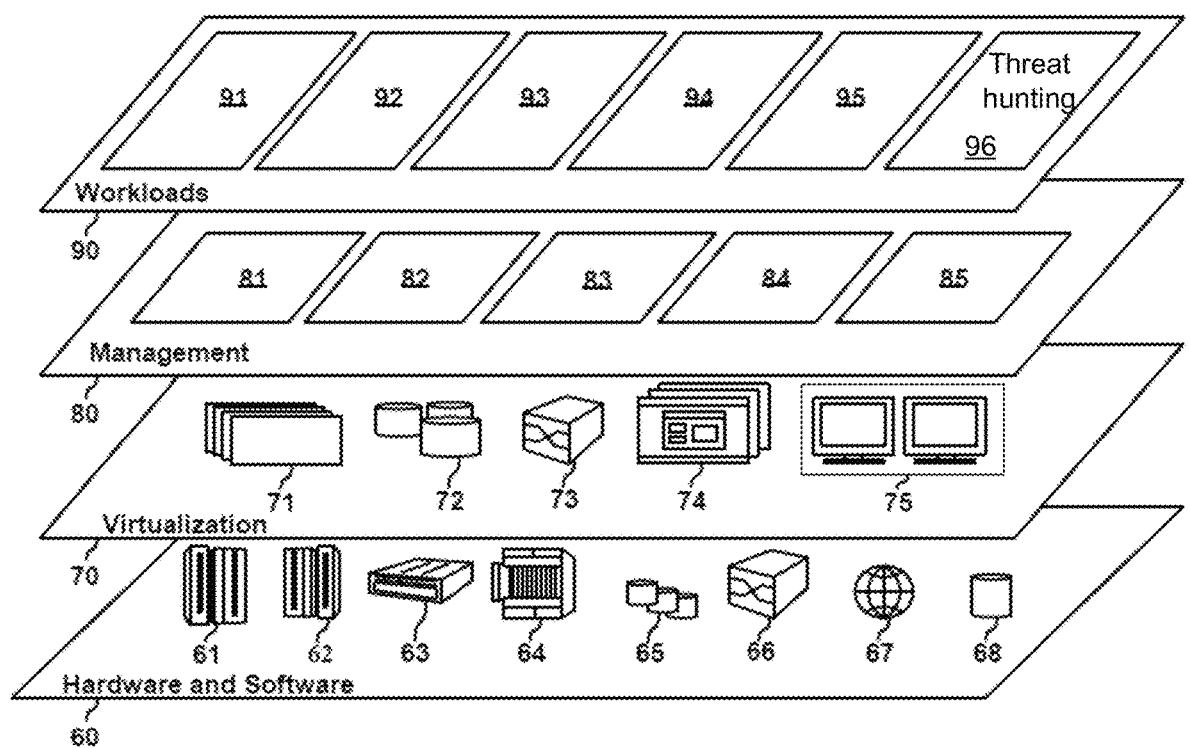
FIG. 2 depicts abstraction model layers in accordance with one embodiment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and structured threat hunting 96 on data gathered through a federated search on at least one security endpoint.

Figure 3:
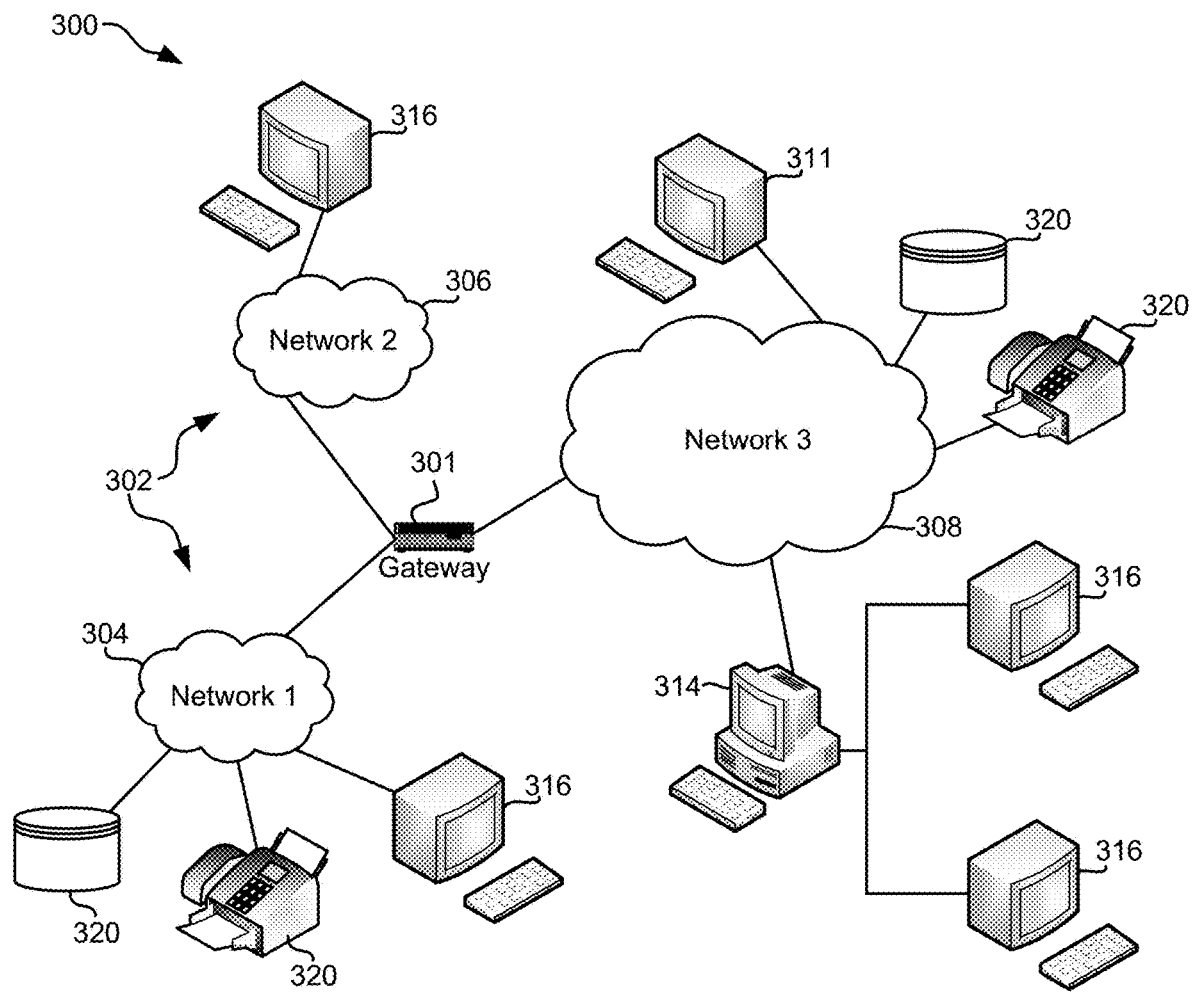
FIG. 3 is a diagram of a network architecture, in accordance with one embodiment.

FIG. 3 illustrates an architecture 300, in accordance with one embodiment. As shown in FIG. 3, a plurality of remote networks 302 are provided including a first remote network 304 and a second remote network 306. A gateway 301 may be coupled between the remote networks 302 and a proximate network 308. In the context of the present architecture 300, the networks 304, 306 may each take any form including, but not limited to a local area network (LAN), a wide area network (WAN) such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, and which is accessible from the remote networks 302 via the gateway 301. It should be noted that the data server(s) 314 may include any type of computing device/groupware. Coupled to each data server 314 is a plurality of user devices 316. User devices 316 may also be connected directly through one of the networks 304, 306, 308. Such user devices 316 may include a desktop computer, lap-top computer, handheld computer, printer or any other type of logic. It should be noted that a user device 311 may also be directly coupled to any of the networks, in one embodiment.

A peripheral 320 or series of peripherals 320, e.g., facsimile machines, printers, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 304, 306, 308, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 4:
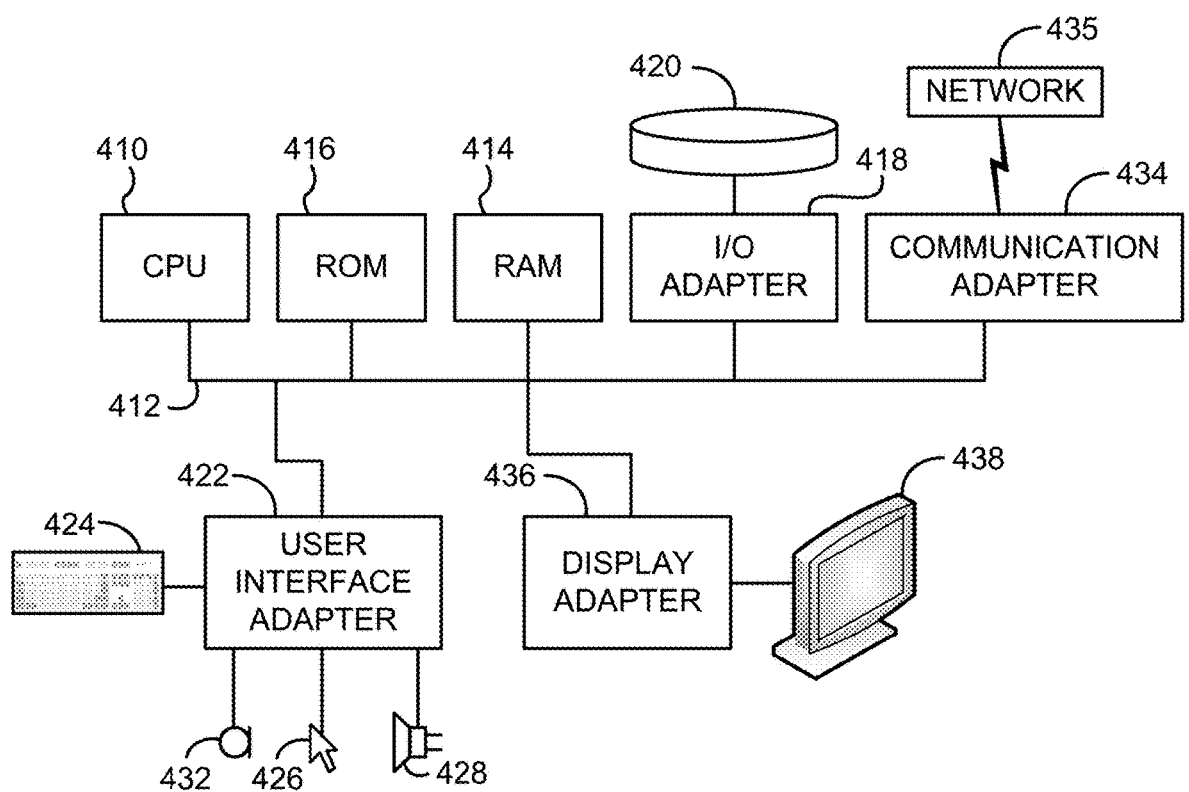
FIG. 4 is a diagram of a representative hardware environment that may be associated with the servers and/or clients of FIG. 3, in accordance with one embodiment.

FIG. 4 shows a representative hardware environment associated with a user device 316 and/or server 314 of FIG. 3, in accordance with one embodiment. Such figure illustrates a typical hardware configuration of a workstation having a central processing unit 410, such as a microprocessor, and a number of other units interconnected via a system bus 412.

The workstation shown in FIG. 4 includes a Random Access Memory (RAM) 414, Read Only Memory (ROM) 416, an input/output (I/O) adapter 418 for connecting peripheral devices such as disk storage units 420 to the bus 412, a user interface adapter 422 for connecting a keyboard 424, a mouse 426, a speaker 428, a microphone 432, and/or other user interface devices such as a touch screen and a digital camera (not shown) to the bus 412, communication adapter 434 for connecting the workstation to a communication network 435 (e.g., a data processing network) and a display adapter 436 for connecting the bus 412 to a display device 438.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

As mentioned above, threat hunting includes proactive actions typically performed by a program that is configured to search for potentially harmful behavior and/or actors within a network. Such proactive actions are typically performed based on the notion that the harmful behavior and/or actors may exist within the network despite active security parameters existing within the network. Various examples of such harmful behavior and/or actors include malicious actors within a network, risky network traffic, large data accesses, etc.

One or more components of a network remain vulnerable to the harmful behavior and/or actors until the harmful behavior and/or actors are addressed. This is problematic because the harmful behavior and/or actors are likely not noticeable until a threat hunt is performed to determine an existence of the actors. This potentially allows the harmful actors to operate undetected for prolonged periods of time within the network.

During a manual threat hunting process, instant responder services may be hired and utilized, which collect data, sort the data, and search for harmful behavior and/or actors within the data. For example, consider a business email compromise occurring in an application; threat hunting may be utilized to collect the endpoint data. Power shells may be searched for, which start from an endpoint connecting to an external source that is known for computer numerical control (CNC). This all takes time to perform, and among different applications, different threat hunting tools are employed. This adds to the complexity of performing threat hunting. Furthermore, conventional threat hunting does not employ reusability when switching between applications, and therefore nothing is shared between instances of performing the threat hunting. This is despite threat hunting across these applications often including repetitive tasks. Moreover, conventional techniques for performing threat hunting do not employ a standard.

In sharp contrast to the deficiencies of the conventional techniques described above, various embodiments and approaches described herein include techniques for standardizing threat hunting by establishing constructs for a sharable and reusable threat hunting template, e.g., a "Hunt." The "Hunt" in some approaches serves as a template and constructs for an apparatus to enable structured threat hunting on the data gathered through a federated search built for a hybrid cloud. Moreover, the "Hunt" is useful for security analyst devices to perform cyber reasoning and threat discovery relatively faster and easier than conventional threat hunting techniques by providing a simple, composable, and interactive way to encode, share and reuse hunting knowledge into hunt-flows. Specifically, the constructs enable a search to be performed for threat hunt data on at least one security endpoint, information about the performed search to be organized and/or managed into steps and variables, analytics to be run on a dataset provided from the performed search and a response to be invoked that protects a system that interacts with the analyzed dataset.

A threat hunt that searches for anomalous and/or suspicious behavior in a federated search environment benefits from these special constructs built for threat hunting. As will be described in greater detail elsewhere below, the constructs may be built on top of Structured Threat Information eXpression (STIX). Data analysis forms a core part of the threat hunting process. Analysts spend a majority of time arranging and transforming the data collected from EDRs, security data lakes, and STEMS. STIX is a standard to capture CTI from the data that spans multiple domains, including security and event management (SIEM), endpoint, network, and file levels. The federated search data is captured/stored and operated upon using the STIX standard. For context, STIX is a standard to capture cyber threat intelligence (CTI) from the data that spans multiple domains, including security and event management (SIEM), endpoint, network, and file levels. The federated search data is captured/stored and operated upon using the STIX standard.

Figure 5:
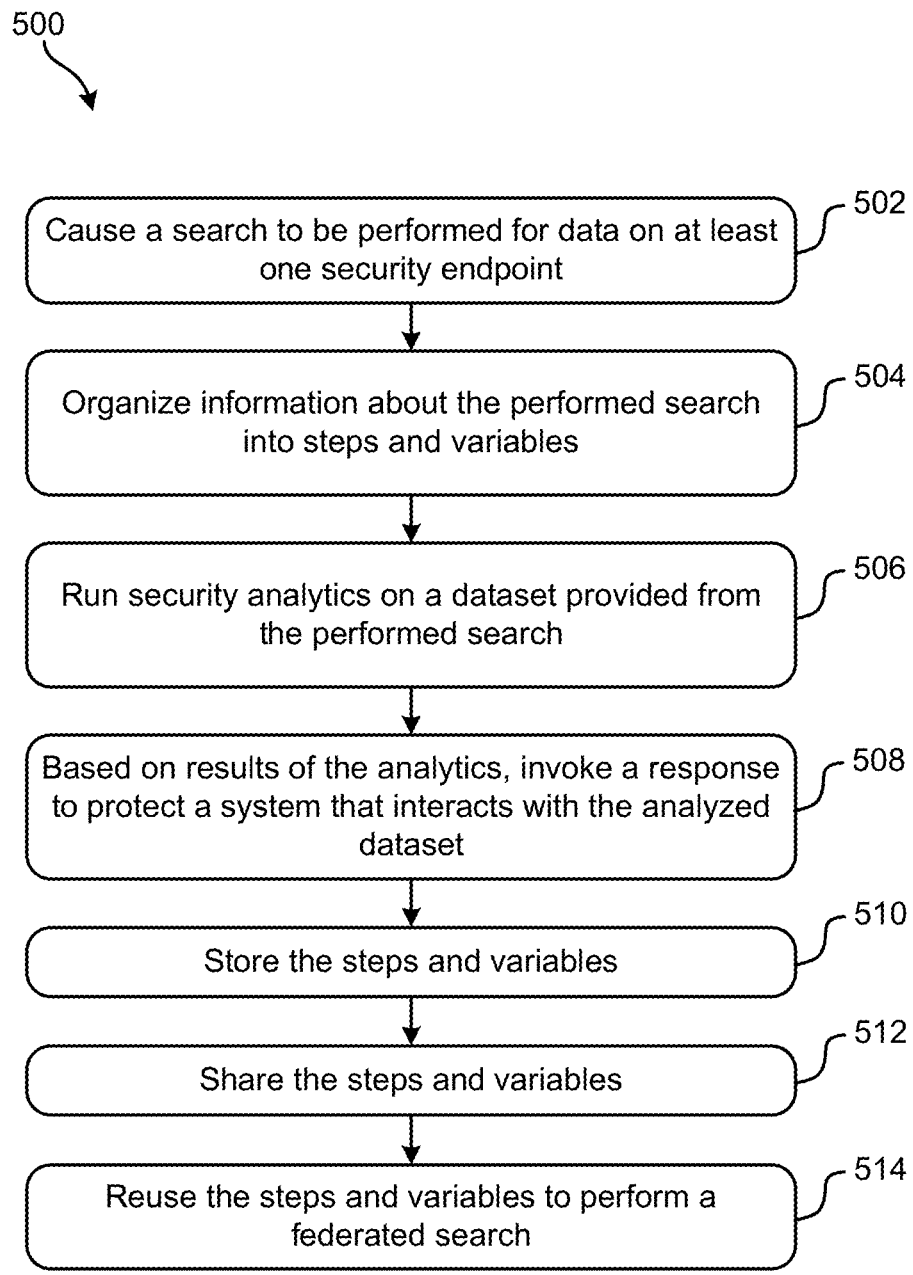
FIG. 5 is a flowchart of a method, in accordance with one embodiment.

Now referring to FIG. 5, a flowchart of a method 500 is shown according to one embodiment. The method 500 may be performed in accordance with the present invention in any of the environments depicted in FIGS. 1-9, among others, in various embodiments. Of course, more or fewer operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

Operation 502 of method 500 includes causing a search to be performed for data on at least one security endpoint of any type. In one approach, the security endpoint may be a portion of a network, e.g., such as a server, a computer, a processor, etc. In another approach, the security endpoint may additionally and/or alternatively be a collection of software code, or any portion thereof. In another approach, the security endpoint may additionally and/or alternatively be a hybrid cloud platform, or any portion thereof.

The search may in some approaches be a federated search that is performed for threat hunt data on the at least one security endpoint. The federated search may in some approaches be performed for data from multiple security endpoint points such as IBM's SIEM, Endpoint Detection And Response (EDR) and/or Guardium. For context, threat hunt data may be defined as data that is not, at least initially, ruled out for analysis to determine whether the hunt data of the security endpoint is anomalous and/or suspicious behavior in a federated search environment.

Causing the search to be performed may in some preferred approaches include instructing a threat hunting core engine (THCE) to perform the search. The THCE may be driven by threat hunting commands in a predefined threat hunting language. For example, the threat hunting language may include commands for patterning and normalizing the data uncovered during the performed search. In one approach, the commands of the language may define instructions to obtain data from one or more predetermined data sources, e.g., such as a security endpoint of the federated search environment. In another approach, the commands of the language may additionally and/or alternatively define instructions to obtain data from one or more data sources that are encountered during a known type of crawl search across the federated search environment. The commands of the language may additionally and/or alternatively define how to sort data on at least one security endpoint. The commands of the language may additionally and/or alternatively define how to apply analytics on the data on at least one security endpoint and furthermore how to invoke a response based on the analytics. One or more known commands that would become apparent to one of ordinary skill in the art upon reading the descriptions herein may additionally and/or alternatively be utilized for patterning and/or normalizing data uncovered during the search. The patterned and/or normalized data obtained as a result of performing such commands may be useful for defining a dataset associated with suspicious processes, e.g., where the dataset is a portion of the data uncovered during the search. For context, as will be described elsewhere below, further analysis may be applied to such a dataset to determine whether anomalous and/or suspicious behavior is in fact present in the at least one security endpoint of the federated search environment, e.g., see operation 506.

In some approaches, the dataset mentioned above may be additionally and/or alternatively determined as a result of analyzing records of the data uncovered in the performed search. For example, individual records of activity of the data uncovered in the performed search are in some approaches analyzed to extract unique cyber-observable entities for inclusion in the dataset. This way, system resources may be preserved in optionally performing analysis on an entity by entity basis rather than aimlessly performing analysis on all data of a federated search environment and/or security endpoint thereof. Extracting unique cyber observable entities furthermore reduces an amount of time and processing that would otherwise be consumed were analysis to be performed on all data of the federated search environment and/or security endpoint thereof. The predefined threat hunting language may use STIX patterning for data acquisition and normalization during the search of the at least one security endpoint. Data uncovered in the performed search and or a dataset thereof may be stored in a database, e.g., to retain the data and/or dataset for further analysis to performed thereon. According to some approaches, the database may include one or more storage locations of a hybrid cloud platform which may include one or more types of storage, e.g., magnetic recording tape, hard disk, etc. Accordingly, in some approaches the data uncovered in the performed search and or a dataset thereof may be stored distributed across a plurality of storage locations in the hybrid cloud platform in some approaches.

The predefined threat hunting language may be utilized to analyze individual records of activity of the data uncovered in the performed search to extract unique cyber observable entities for inclusion in the dataset. For example, in some approaches, the predefined threat hunting language may define operations to perform on the entities for modifying details of the dataset. For context, in some approaches, the term "modifying" may refer to an operation that is performed to increase an extent of contents of the dataset. For example, in one of such approaches, the predefined threat hunting language may define an operation for finding related entities of instances of data uncovered in the performed search. The related entities may be included in the dataset. In contrast, in some approaches, the term "modifying" may refer to an operation that is performed to increase an extent of contents of the dataset. For example, in one of such approaches, the predefined threat hunting language may additionally and/or alternatively define an operation for filtering instances of data uncovered in the performed search. The filtered instances of data may in some approaches be excluded from the dataset. In another approach, the predefined threat hunting language may additionally and/or alternatively define an operation for enabling visualization of instances of data uncovered in the performed search. The predefined threat hunting language may additionally and/or alternatively define an operation for aggregation of instances of data uncovered in the performed search. Aggregation operations may be useful for reducing an amount of data that is analyzed without sacrificing a scope of broadness of the search that is performed as different instances of data across a plurality of security endpoints in the federated search environment may be aggregated into a dataset for analysis. Depending on the approach, one or more known operations that would become apparent to one of ordinary skill in the art upon reading the descriptions herein may be utilized for the operations defined within the predefined threat hunting language. In some approaches the predefined threat hunting language may additionally and/or alternatively include a "user defined function" capability to run analytics on the entities and records of the federated search environment. This may provide a customizable aspect to a sharable and/or reusable template of the threat hunting, e.g., see "Hunt" described in greater detail below.

Various illustrative embodiments of threat hunting in which commands of the THCE may be applied to perform the search in order to determine a dataset that is potentially associated with anomalous and/or suspicious behavior are described below. A first embodiment of threat hunting includes matching a Tactics, Techniques, and Procedures (TTP) such as process exploit, and then finding the payload process (malicious). The threat hunting includes then finding activities of the payload process to uncover a malicious attack plot. Another embodiment of threat hunting includes searching for suspicious behaviors as a step in a hunt such as: an office application launching power shell which in turn downloads and starts a process with obfuscated command line. Yet another embodiment of threat hunting includes checking network traffic against pre-defined or pre-trained models to identify domain name generation (DGA) or data exfiltration. Linking back to the host and process associated with the network traffic is then performed to uncover command and control (C&C) communication and data exfiltration attacks. Another embodiment of threat hunting includes screening all system startup services, selecting suspicious services to drill down, revealing a process that setup the startup service and the process that is spawned by the service to understand its activity, and finally uncovering a persistent threat. Yet another embodiment of threat hunting includes grouping network traffic by an associated occurring time of the day, filtering spikes and diving into the network traffic that causes the spikes, and associated hosts and processes and data flow sources, to detect potential data exfiltration attack campaigns.

Operation 504 of method 500 includes organizing and/or managing information about the performed search into steps and variables. Such an operation may also be referred to as "hunt organization," as one goal of performing one or more operations of method 500 may include providing a template, e.g., "Hunt," including threat hunt information and analysis that may be shared and/or reused for performing federated searches thereafter, e.g., on one or more security endpoints of the federated search environment and/or on one or more security endpoints of another federated search environment. Organizing and/or managing information about the performed search in some approaches may begin with data uncovered by the search being organized into a logical entity, e.g., the "Hunt." The logical entity, e.g., "Hunt," itself contains "steps" which are iterative and executable. Steps involve collection of data, application of analytics, transformations and/or enrichment of data uncovered in the performed search. The result of performing each step may be a variable which provides a perspective and/or view into an output of each step. Accordingly, the steps and variables define the operative steps and results of a performed threat hunt in order to serve as a template, e.g., "Hunt," that is a sharable and reusable threat hunting process template of the threat hunting and response achieved by performing one or more operations of method 500. In some approaches, the result of a step is also a visual graphic representation, e.g., as described in greater detail elsewhere herein (see FIG. 7). In some approaches the steps may include a predetermined command, e.g., LOAD, FIND, GET, etc.

Security analytics are run on a dataset, or a plurality of datasets, provided from the performed search, e.g., see operation 506. In one approach, an analytics orchestration may be invoked to run extended security analytics on the dataset, or a plurality of datasets, provided from the performed search, e.g., the dataset associated with suspicious processes. Running the analytics on the dataset may include one or more operations which will now be described according to various approaches. In one approach, running the analytics on the dataset may include performing data enrichment by gathering and annotating threats within the dataset. One or more techniques that would become apparent to one of ordinary skill in the art upon reading the descriptions herein may additionally and/or alternatively be utilized for gathering and annotating threats within a dataset. For example, in some approaches, known techniques for gathering and annotating threats within the dataset may be utilized. Running the analytics on the dataset may additionally and/or alternatively include performing clustering of data of the dataset. For example, in some approaches, K-Means and/or a known type of graph-based clustering algorithm may be used to performing clustering of data of the dataset where the dataset and/or information about the search is included in a visual graphic representation. In some other approaches, known technique(s) for performing clustering of data of a dataset may additionally and/or alternatively be used. Running the analytics on the dataset may additionally and/or alternatively include performing outlier detection on data of the dataset, e.g., a threat with anomalous and/or suspicious behavior. Based on the run analytics, one or more instances of data may be determined to be associated with anomalous and/or suspicious behavior. For example, instances of data that are identified as a result of performing outlier detection on data of the dataset may be determined to be associated with anomalous and/or suspicious behavior. In another approach, instances of data of the dataset that are clustered with an instance of data of the dataset that is determined to be associated with anomalous and/or suspicious behavior, may also be determined to be associated with anomalous and/or suspicious behavior. Instances of data identified from the results of gathering and annotating threats within the dataset may additionally and/or alternatively be determined to be associated with anomalous and/or suspicious behavior.

Note that in some approaches, the analytics are performed on a serverless platform such as a hybrid cloud platform. More specifically, in some approaches because analytics that are run may be relatively compute intensive and in order to realize memory and/or CPU limitations, the analytics may be run on an elastic serverless platform such as a hybrid cloud platform. The hybrid cloud platform may in some approaches be similar to and/or include any one or more components illustrated in the embodiments of other FIGS included herein. The hybrid cloud platform may in some other approaches be similar to and/or include any one or more components of known types of hybrid cloud platforms.

Federated data enrichment and/or additional insights are in some preferred approaches added to the data collected during threat hunting of method 500. In some approaches the data enrichment and/or additional insights are added to the dataset as a result of the extended security analytics, e.g., a security analytics step, being run on the dataset, e.g., see operation 506. Such data enrichment and/or additional insights may additionally and/or alternatively be added to information organized and/or managed in the logical entity, e.g., the "Hunt." The process of adding federated data enrichment and/or additional insights to the dataset is in some approaches invoked as a result of executing an "APPLY" command in the THL which results in invocation of a containerized software that implements purpose built analytics code. The analytic insights that result from the performed analysis preferably become part of the resulting variable, e.g., collection of data, in the THL. Moreover, performance of analytics as a pipeline may be composed in some approaches using known techniques, as this allows a sequence of transformations and steps to be performed as part of a single analytics invocation.

As described above, results of the analytics may include instances of data that are determined to be associated with anomalous and/or suspicious behavior, federated data enrichment, additional insights, etc. These results may optionally be added to the template including threat hunt information, e.g., "Hunt" in some approaches.

In some approaches, a response to protect a system that interacts with the analyzed dataset may be invoked based on results of the analytics, e.g., see operation 508. More specifically, the system that interacts with the analyzed dataset may be a system that uses at least some instances of the dataset determined to be associated with anomalous and/or suspicious behavior. During threat hunting, e.g., which may include any of the steps of method 500 in the process of establishing the "Hunt," at any point a response command may be initiated to trigger a predefined automated playbook run. In some preferred approaches, playbooks are predefined ansible scripts that perform certain action in a coordinated environment, e.g., such as coordinated environment that includes one or more components of the system that interacts with the analyzed dataset. Invoking the response in some approaches includes causing robotic response automation launching BOTs to execute commands of a playbook. Note that a BOT may be defined as a piece of software that automates a request with a predetermined various goal. Moreover, the playbook may store and/or define predefined ansible scripts that perform certain actions in coordinated environment. Accordingly, ansible script processing BOTs capable of processing the commands in the playbook may be directed to pick up and execute the response actions.

In one approach, the response may include requesting and/or re-requesting access credentials from a device, e.g., such as a device that is determined to have interacted with at least some instances of the dataset determined to be associated with anomalous and/or suspicious behavior. In another approach, the response may additionally and/or alternatively include inserting a firewall, e.g., inserting a firewall in one or more components that are determined to potentially interact with at least some instances of the dataset determined to be associated with anomalous and/or suspicious behavior. According to yet another approach, the response may additionally and/or alternatively include terminating a session, e.g., a session having network traffic originates from a device that is determined to be associated with anomalous and/or suspicious behavior. The response may additionally and/or alternatively include powering down a server. Such a server may be included in a hybrid cloud platform, and have at least a portion of the dataset and/or executable software associated with the dataset stored thereon. The response may additionally and/or alternatively include quarantining one or more components of the system, where the quarantined components of the system are determined using known techniques to be potentially subject to corruption and/or damage as a result of the anomalous and/or suspicious behavior. The response is useful from a performance standpoint in that security threats that exist in the search environment are addressed, e.g., mitigated. Accordingly, the response also enables a preservation of processing/computing resources of the search environment that would otherwise be expended in recovering from damage that the security threats would cause in the search environment if not mitigated. The "Hunt" is also standardized and therefore repeatable across a plurality of different search environments.

Figure 9:
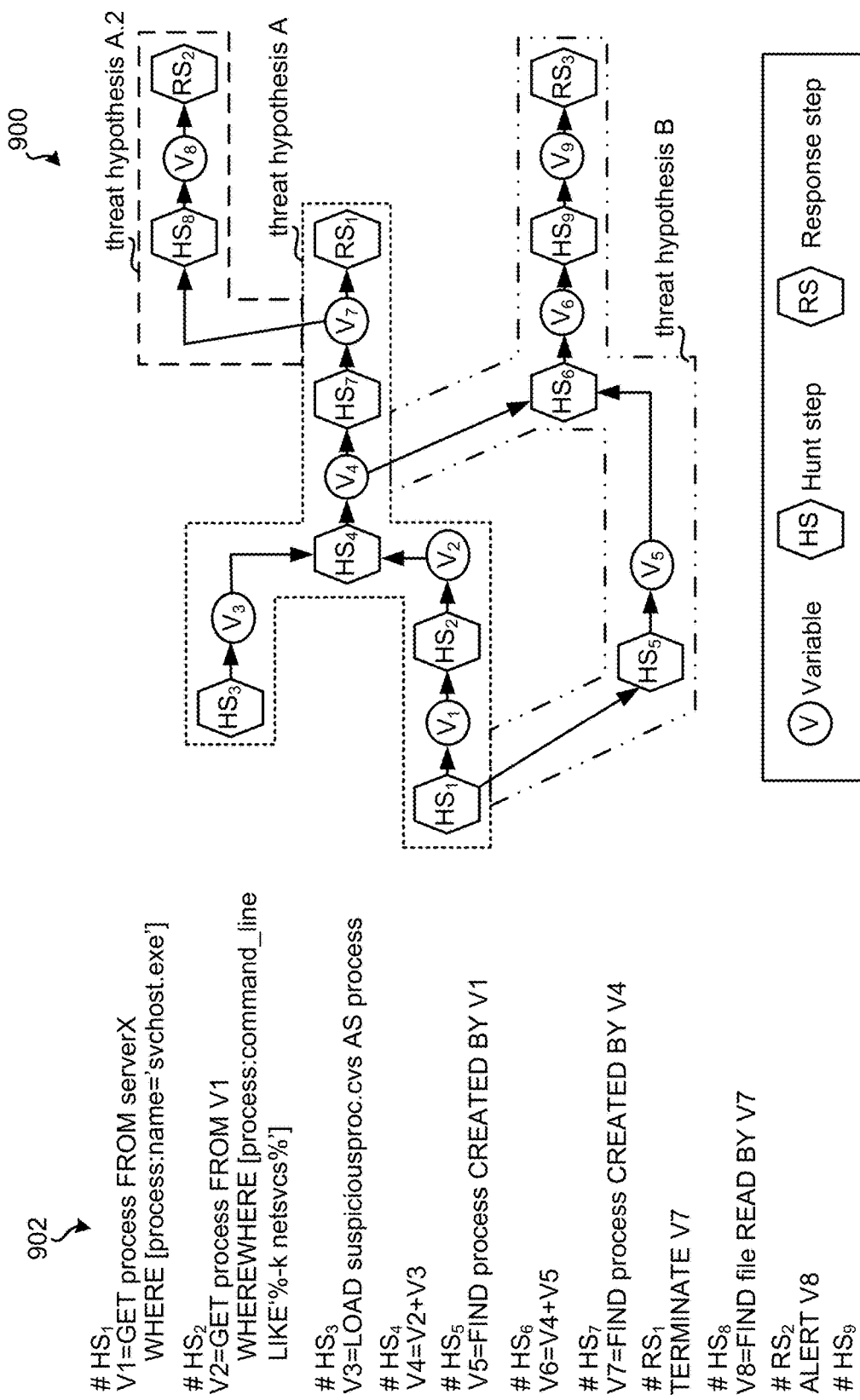
FIG. 9 is a diagram of a hunt-flow architecture, in accordance with one embodiment.

Information about the analytics and/or response, e.g., see hunt steps and response steps of FIG. 9, may be added to the organized information, e.g., of the "Hunt," to provide additional detail and/or context for future hunts that are performed using the "Hunt." Operation 510 includes storing the steps and variables of the "Hunt" in accordance with one approach. This storage operation may be a part of a larger storage operation, e.g., such as an operation that includes storing the "Hunt." Operation 512, if performed, includes sharing the steps and variables and/or the "Hunt" itself. This information may be shared with any one or more destinations that can reuse the information to perform a federated search on other endpoints of the same and/or another federated search environment. Such destinations may include, e.g., other systems, a device managing one or more other security endpoints, a server, a troubleshooting application, a known type of security application, a known type of device that is used to manage and/or perform threat hunts, etc. The "Hunt" and/or the steps and variables thereof may be reused to perform a federated search, e.g., see operation 514. For example, a device having a controller and/or processor may use the "Hunt" and/or the steps and variables thereof may be reused to perform a federated search in response to a determination that similar system parameters/metrics, e.g., anomalous/suspicious behavior, that existed while the steps and variables were developed to organize the "Hunt," are detected and/or known to be present, e.g., on the device, on data used by the device, on a security endpoint associated with the device, on a hybrid cloud platform that includes the device, etc. In response to detecting these similar system parameters/metrics, a playbook that includes the "Hunt" may be accessed and applied to protect one or more components and/or systems that are determined to be at risk to the similar system parameters/metrics.

The techniques in various embodiments and approaches described herein provide numerous benefits that are not otherwise enabled by conventional threat hunting. In some embodiments described herein, these techniques include unique constructs built for federated search data to define, organize and analyze data during threat hunting on a hybrid cloud platform. Moreover, these techniques include organization of hunts as steps and variables (hunt data of a hunt-flow) that is sharable and re-playable as a "Hunt." Extended analysis functions for federated search datasets run on a serverless compute, and inline invocation of robotic process automation that acts on incident response during a threat hunt may also be incorporated into such techniques. These techniques have heretofore not been considered in conventional threat hunting, and in sharp contrast, conventional threat hunting does not employ reusability when switching between applications. Thus, within conventional threat hunting, nothing is shared between instances of threat hunting performance. Accordingly, the inventive discoveries disclosed herein, e.g., with regards to use of organization of threat hunts as steps and variables that is sharable and re-playable, proceed contrary to conventional wisdom.

Figure 6:
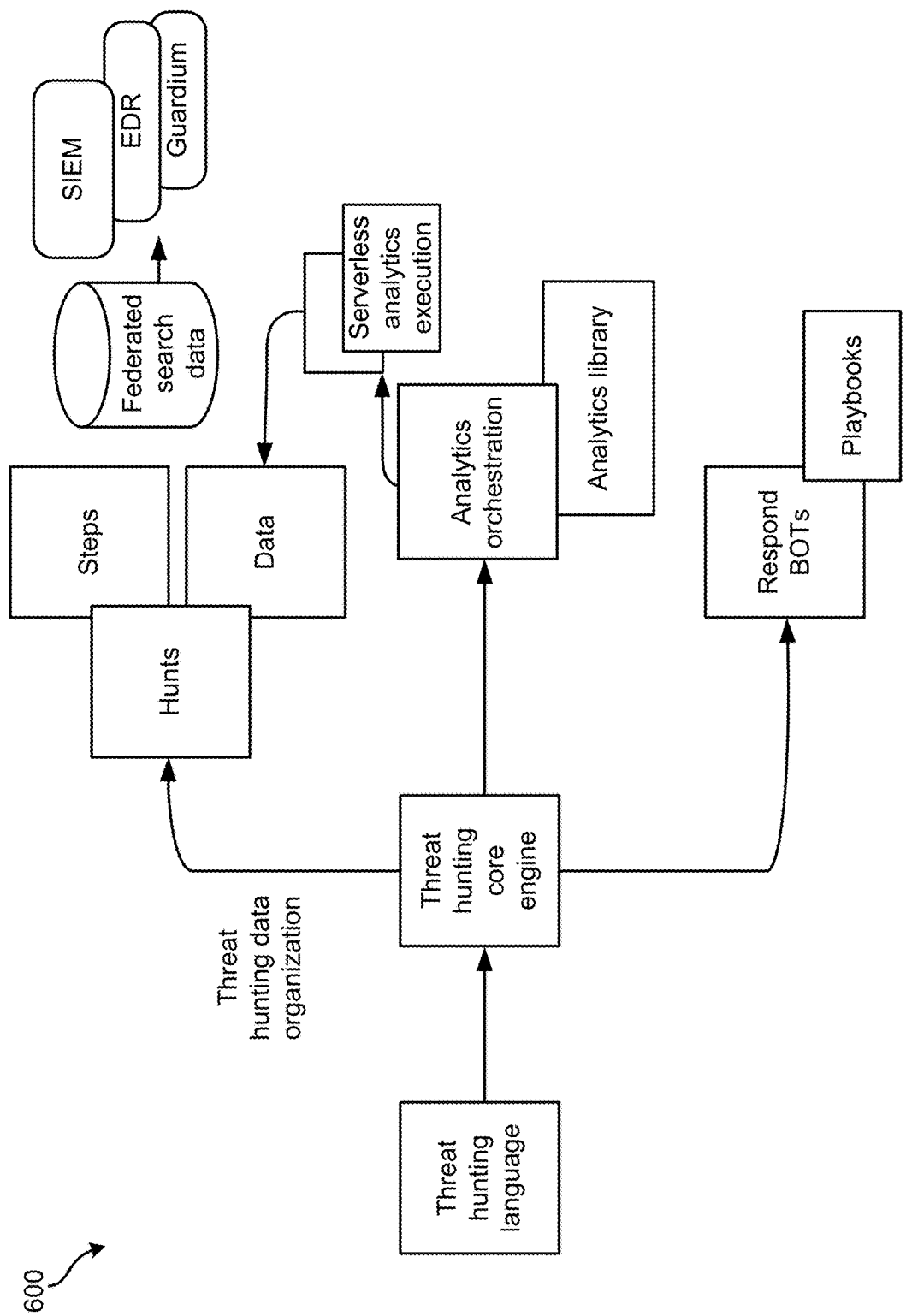
FIG. 6 is a diagram of a threat hunting architecture, in accordance with one embodiment.

FIG. 6 depicts an architecture 600, in accordance with one embodiment. As an option, the present architecture 600 may be implemented in conjunction with features from any other embodiment listed herein, such as those described with reference to the other FIGS. Of course, however, such architecture 600 and others presented herein may be used in various applications and/or in permutations which may or may not be specifically described in the illustrative embodiments listed herein. Further, the architecture 600 presented herein may be used in any desired environment.

In FIG. 6, the architecture 600 illustrates a threat hunting core engine (THCE), which may be used in a threat hunting process such as the threat hunting process described in method 500. The THCE is driven by threat hunting commands from a threat hunting language, e.g., see a logical path flow from the "Threat hunting language" to the THCE. Federated searches are performed by the THCE, e.g., see "Federated search data," and data from multiple security endpoint points, e.g., see "SIEM", "EDR" and "Guardium", is normalized. Threat hunt data from the search is organized and managed, e.g., see "Data" and "Steps" of the "Hunt" and a Threat hunting data organization logical path of the THCE flow to the Hunt. Analytics orchestration is invoked for running extended security analytics on the federated search data. For example, the analytics orchestration may be invoked using predefined commands of an analytics library. In some approaches the extended security analytics may be run on a serverless platform, e.g., see "Serverless analytics execution." The THCE may additionally and/or alternatively invoke robotic response automation launching BOTs to execute playbooks, e.g., see "Respond BOTs" having access to "Playbooks."

Figure 7:
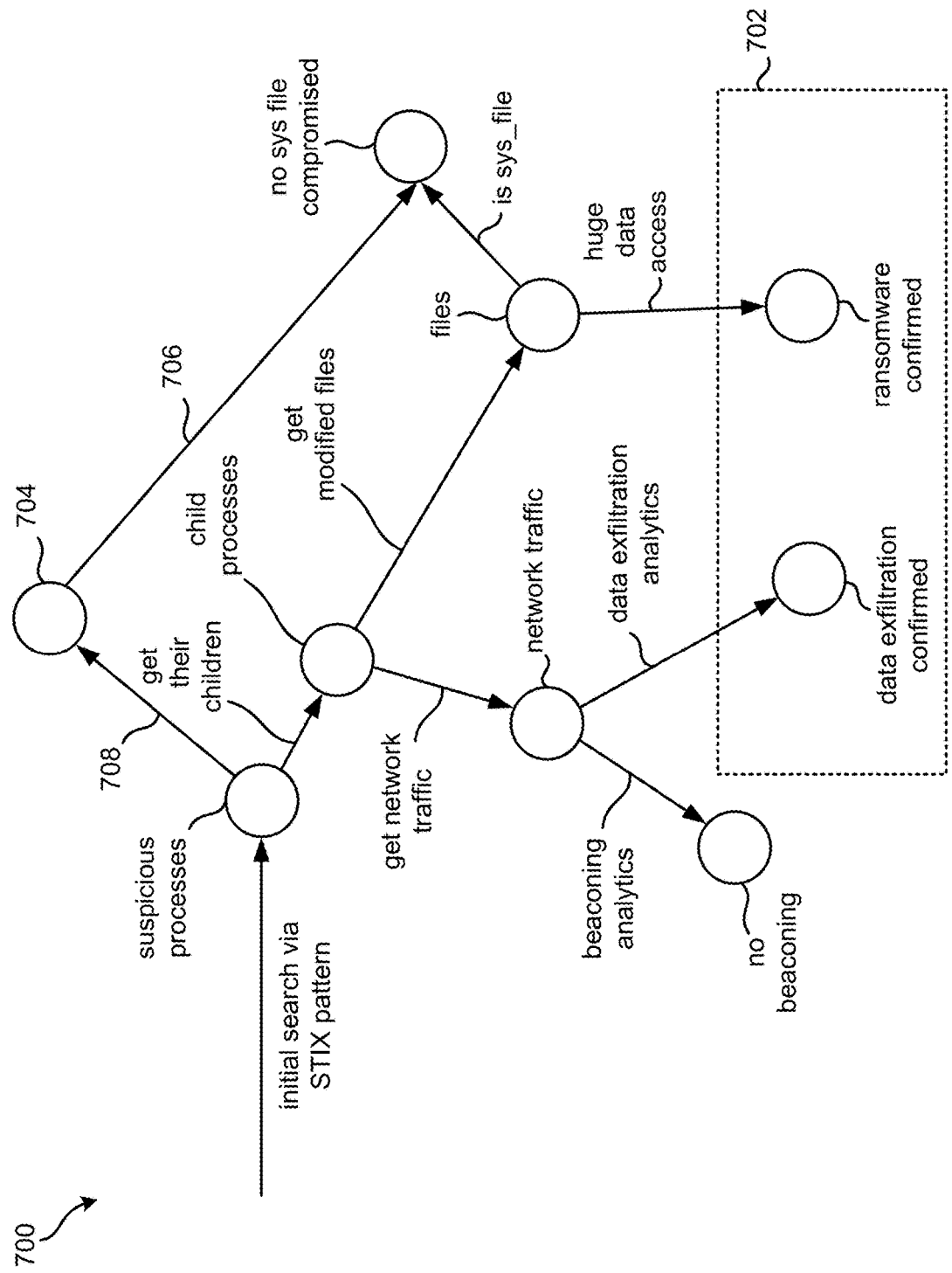
FIG. 7 is a flowchart of a process architecture, in accordance with one embodiment.

FIG. 7 depicts a flowchart of a process architecture 700, in accordance with one embodiment. As an option, the present process architecture 700 may be implemented in conjunction with features from any other embodiment listed herein, such as those described with reference to the other FIGS. Of course, however, such process architecture 700 and others presented herein may be used in various applications and/or in permutations which may or may not be specifically described in the illustrative embodiments listed herein. Further, the process architecture 700 presented herein may be used in any desired environment.

As described in greater detail elsewhere herein, a predefined threat hunting language of an THCE may define an operation for finding related entities of instances of data uncovered in a performed search. For example, a known type of "FIND" command and/or construct may be executed during a federated search of at least one security endpoint to find security specific relationships within data uncovered during the search. The related entities may be included in a dataset that is analyzed. A known type of sorting command may in one approach additionally and/or alternatively be used during the search to sort the data uncovered during the search. A known type of display command may in another approach additionally and/or alternatively be used during the search. In another approach, pattern matching may be performed during the search. For example, a predetermined STIX command for pattern matching may be included in a template for performing a federated search, e.g., a "Hunt" that includes steps and variables, and upon being executed, the command may return matching patterns within the searched data. By using the STIX language, diverse language specific commands are not required for the search performed.

According to various approaches, in a first step, the commands may be configured to return one or more predetermined pattern matches, e.g., a process having a predetermined command line, network traffic with a predetermined IP address, network traffic with a predetermined destination port, etc. In a second step, the commands may be configured to return one or more related entities, e.g., child processes, of discovered, e.g., returned, predetermined pattern matches. For example, in the process architecture 700, an initial search via STIX pattern is performed on at least one endpoint. This search may return data on at least one security endpoint, e.g., suspicious processes, that meet one or more predetermined pattern matches of a command executed to perform the search. One or more related entities of the suspicious processes may be determined. For example, in one approach, a known type of command to determine child processes of the suspicious processes is performed, e.g., see "get their children," which may use a known type of "GET" command to return child processes. These child processes may route to a destination such as a malicious website, at least one known malicious address, etc. In one approach, files for the child processes may be determined in the process of finding related entities of the suspicious processes. A known type of command for determining and/or obtaining modified files of child processes may be executed, which may return files. In response to a determination that a data access of a process to the files is greater than a predetermined size threshold, e.g., see "huge data access," it may be determined that the process is a ransomware attack, e.g., see "ransomware confirmed." In contrast, it may be determined that none of the files are compromised, e.g., see "no sys file compromised," in response to a determination that the data access is not greater than the predetermined size threshold, e.g., see "in sys file." Network traffic of the child processes may additionally and/or alternatively be obtained using one or more known techniques, e.g., see "get network traffic" return "network traffic." Analytics defined in a predefined "FIND" construct may be performed on the network traffic to determine whether a system that interacts with the results are a dangerous threat. For example, a known type of beaconing analytics and/or data exfiltration analytics may be performed on the network traffic. In one approach, from the analytics it may be determined that no beaconing exists in the network traffic. In contrast, it may be determined that a data exfiltration is confirmed, e.g., such as in response to a determination that the network traffic flows from a process to a file to another process. Based on finding threats 702 such as the data exfiltration and the ransomware, a predetermined response may be invoked to protect a system that interacts with data to determine the threats.

It may also be noted that merging may occur between two or more processes in a "Hunt." For example, an additional known type of related information about the suspicious processes may be determined, e.g., see step 708 return variable 704. The variable 704 merges with the "files" variable to the "no sys file compromised" variable as a result of step 706 being performed.

Note that the circles, e.g., such as "child processes," in FIG. 7 illustrate variable information about the performed search, while the arrows, e.g., such as "get their children," in FIG. 7 illustrate step information about the performed search. These steps and variables may be organized into a sharable and reusable "Hunt."

Figure 8:
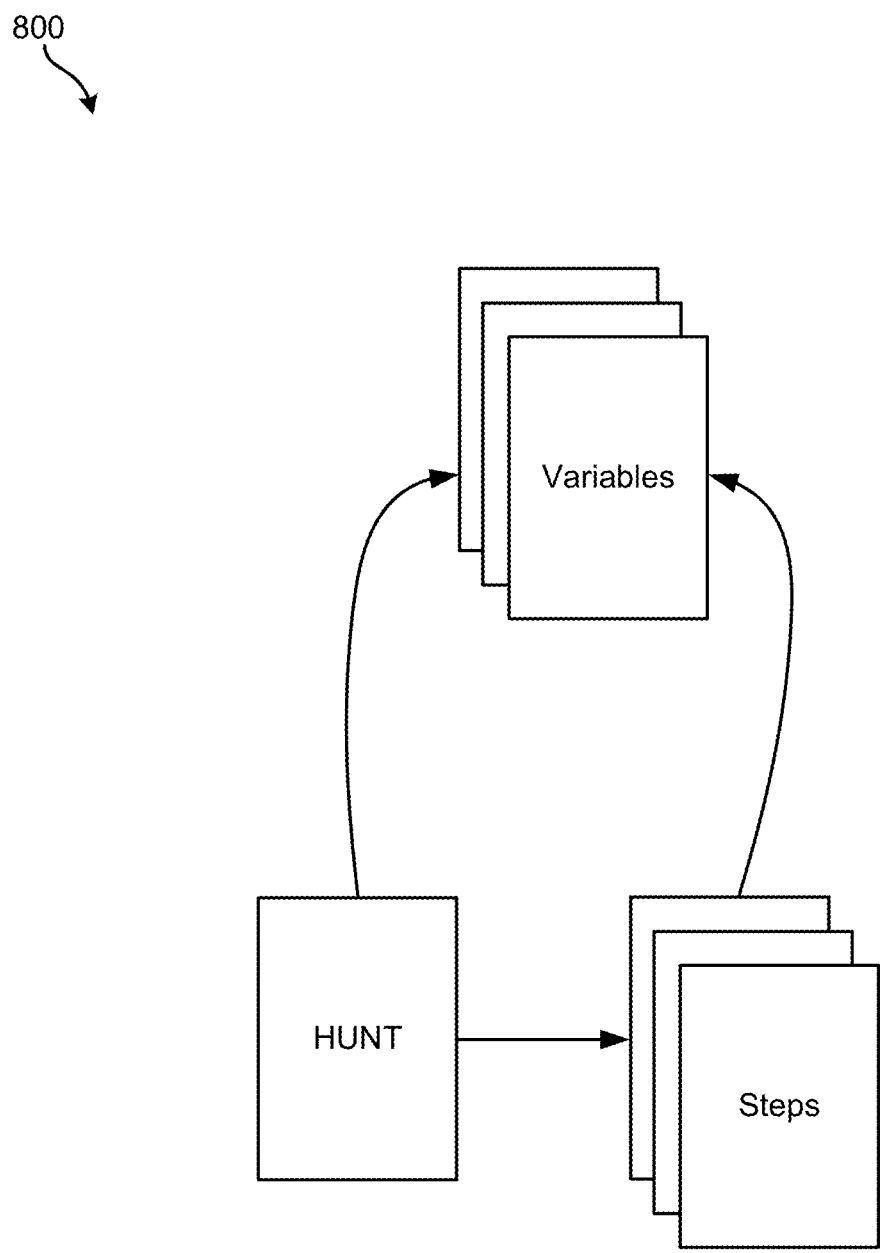
FIG. 8 is a depiction of an architecture of a threat hunting template, in accordance with one embodiment.

FIG. 8 depicts an architecture 800, in accordance with one embodiment. As an option, the present architecture 800 may be implemented in conjunction with features from any other embodiment listed herein, such as those described with reference to the other FIGS. Of course, however, such architecture 800 and others presented herein may be used in various applications and/or in permutations which may or may not be specifically described in the illustrative embodiments listed herein. Further, the architecture 800 presented herein may be used in any desired environment.

The architecture 800 includes information about a search performed in accordance with operations described elsewhere herein, e.g., see method 500. For example, the information includes "Steps" and "Variables." The information about the performed search may be organized and managed into a "HUNT," using techniques similar to those described in operation 504 of method 500. Such an operation may also be referred to as "hunt organization," as one goal of performing such organizing and managing includes providing a template, e.g., see "HUNT," that includes threat hunt information and analysis that may be shared and/or reused for performing federated searches thereafter. For example, the federated searches may be performed using the "HUNT" on one or more security endpoints of a federated search environment.

FIG. 9 depicts a hunt-flow architecture 900, in accordance with one embodiment. As an option, the present architecture 900 may be implemented in conjunction with features from any other embodiment listed herein, such as those described with reference to the other FIGS. Of course, however, such architecture 900 and others presented herein may be used in various applications and/or in permutations which may or may not be specifically described in the illustrative embodiments listed herein. Further, the architecture 900 presented herein may be used in any desired environment.

The architecture 900 includes a plurality of hunt steps, e.g., see "$HS_{1-9}$," variables, e.g., see "V," and response steps, e.g., see "$RS_{1-3}$," that are chained together with merging into hunt-flows, e.g., see the connection between threat hypothesis B and threat hypothesis A and the connection between threat hypothesis A and threat hypothesis A.2. FIG. 9 also includes a collection of pseudocode 902 that further defines the specifics of operations that are performed in each of the hunt steps and each of the response steps. Note that the variables are generated as output, e.g., a result, of the hunt steps. In the collection of pseudocode 902, hunt steps include "GET" operations which are used for pattern matching, "FIND" operations which are used for finding related entities, "ALERT" operations and "TERMINATE" operations which are responses that may be applied during threat hunting. According to one specific example, a variable $V_7$ may include finding processes created by $V_4$, e.g., the parent processes. In response to a determination that the processes are malicious, the process may be terminated, e.g., see "TERMINATE" of the pseudocode 902 as well as $RS_1$. In another example, a variable $V_8$ may find files read by another variable, e.g., see FIND file READ BY $V_7$. It may be determined that the files are suspicious, and $V_8$ may be alerted, e.g., see "ALERT $V_8$."

It should be noted that the hunt-flow of FIG. 9 also includes merging of different variables to the same hunt step. For example, $V_6$ is equal to $V_4$ and $V_5$ based on the merge of $V_4$ and $V_5$. Accordingly, $V_6$ is a collection of data that includes a multitude of processes that are captured by $V_4$ and $V_5$. Similarly, $V_4$ is equal to $V_2$ and $V_3$ based on the merge of $V_2$ and $V_3$. Accordingly, $V_4$ is a collection of data that includes a multitude of processes that are captured by $V_2$ and $V_3$.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   causing a first search to be performed for data on a first security endpoint of a first federated search environment;
   organizing information about the first search into steps and variables, wherein a result of performance of the steps includes the variables, wherein the steps include commands iteratively executed during the first search;
   running security analytics on a dataset of the data uncovered during the first search;
   detecting first behavior on a second security endpoint of a second federated search environment, wherein the first behavior is associated with parameters and metrics of second behavior of the first security endpoint that existed during development of the steps and variables; and
   in response to the detection of the first behavior, reusing the steps and variables to perform a second search on a second security endpoint of the second federated search environment,
   wherein the reusing the steps and variables to perform the second search includes iteratively executing the commands during the second search.

2. The computer-implemented method of claim 1, wherein the first search is performed by a threat hunting core engine (THCE) driven by threat hunting commands in a predefined threat hunting language, wherein the predefined threat hunting language includes commands for Structured Threat Information expression (STIX) patterning and normalizing the data uncovered during the first search, wherein the second search is performed by the THCE.

3. The computer-implemented method of claim 2, wherein individual records of activity of the data uncovered in the first search are analyzed to extract unique cyber observable entities for inclusion in the dataset, wherein the predefined threat hunting language defines operations to perform on the entities for modifying details of the dataset.

4. The computer-implemented method of claim 3, wherein the operations are selected from the group consisting of: finding related entities, visualization, filtering, and aggregation.

5. The computer-implemented method of claim 1, wherein the analytics run on the dataset include performing data enrichment by gathering and annotating threats within the dataset and performing clustering of data of the dataset, wherein the analytics are run on a serverless platform.

6. The computer-implemented method of claim 1, wherein the variables provide perspectives into outputs of the steps, wherein a first of the variables results from the performance of a first of the steps, wherein the first step is included in a first logical search path having a first subset of the steps performed during the first search, wherein the first variable results from the performance of a second of the steps, wherein the second step is included in a second logical search path having a second subset of the steps performed during the first search, wherein a second of the variables only results from a performance of a third of the steps.

7. The computer-implemented method of claim 1, comprising: based on results of running the analytics, invoking a response to protect a system that interacts with the dataset, wherein invoking the response includes causing robotic response automation launching BOTs to execute commands of a playbook, wherein the playbook stores and/or defines predefined ansible scripts that perform certain actions in a coordinated environment that includes components of the system that interacts with the dataset.

8. The computer-implemented method of claim 7, wherein the response is selected from the group consisting of: requesting access credentials, inserting a firewall, terminating a session, powering down a server, and quarantining one or more components of a system.

9. The computer-implemented method of claim 1, wherein the organizing information about the first search into steps and variables includes building a threat hunting template that lists the commands iteratively executed during the first search, and comprising: storing the threat hunting template in a playbook.

10. The computer-implemented method of claim 9, wherein a first of the steps includes transforming the data uncovered during the first search.

11. A computer program product, the computer program product comprising a computer readable storage medium having program instructions embodied therewith, the program instructions readable and/or executable by a computer to cause the computer to:
   cause, by the computer, a first search to be performed for data on a first security endpoint of a first federated search environment;
   organize, by the computer, information about the first search into steps and variables, wherein a result of performance of the steps includes the variables, wherein the steps include commands iteratively executed during the first search;
   run, by the computer, security analytics on a dataset of the data uncovered during the first search;

detect, by the computer, first behavior on a second security endpoint of a second federated search environment, wherein the first behavior is associated with parameters and metrics of second behavior of the first security endpoint that existed during development of the steps and variables; and in response to the detection of the first behavior, reuse, by the computer, the steps and variables to perform a second search on a second security endpoint of the second federated search environment, wherein the reusing the steps and variables to perform the second search includes iteratively executing the commands during the second search.

12. The computer program product of claim 11, wherein the first search is performed by a threat hunting core engine (THCE) driven by threat hunting commands in a predefined threat hunting language, wherein the predefined threat hunting language includes commands for Structured Threat Information expression (STIX) patterning and normalizing the data uncovered during the first search, wherein the second search is performed by the THCE.

13. The computer program product of claim 12, wherein individual records of activity of the data uncovered in the first search are analyzed to extract unique cyber observable entities for inclusion in the dataset, wherein the predefined threat hunting language defines operations to perform on the entities for modifying details of the dataset.

14. The computer program product of claim 13, wherein the operations are selected from the group consisting of: finding related entities, visualization, filtering, and aggregation.

15. The computer program product of claim 11, wherein the analytics run on the dataset include performing data enrichment by gathering and annotating threats within the dataset and performing clustering of data of the dataset, wherein the analytics are run on a serverless platform.

16. The computer program product of claim 11, wherein the variables provide perspectives into outputs of the steps, wherein a first of the variables results from the performance of a first of the steps, wherein the first step is included in a first logical search path having a first subset of the steps performed during the first search, wherein the first variable results from the performance of a second of the steps, wherein the second step is included in a second logical search path having a second subset of the steps performed during the first search, wherein a second of the variables only results from a performance of a third of the steps.

17. The computer program product of claim 11, the program instructions readable and/or executable by a computer to cause the computer to: based on results of running the analytics, invoking a response to protect a system that interacts with the dataset, wherein invoking the response includes causing robotic response automation launching BOTs to execute commands of a playbook, wherein the playbook stores and/or defines predefined ansible scripts that perform certain actions in a coordinated environment that includes components of the system that interacts with the dataset.

18. The computer program product of claim 17, wherein the response is selected from the group consisting of: requesting access credentials, inserting a firewall, terminating a session, powering down a server, and quarantining one or more components of a system.

19. The computer program product of claim 11, wherein the organizing information about the first search into steps and variables includes building a threat hunting template that lists the commands iteratively executed during the first search, and the program instructions readable and/or executable by the computer to cause the computer to: store, by the computer, the threat hunting template in a playbook.

20. A system, comprising:
a processor; and
logic integrated with the processor, executable by the processor, or integrated with and executable by the processor, the logic being configured to:
cause a first search to be performed for data on a first security endpoint of a first federated search environment;
organize information about the first search into steps and variables, wherein a result of performance of the steps includes the variables, wherein the steps include commands iteratively executed during the first search;
run security analytics on a dataset provided from the first search
detect first behavior on a second security endpoint of a second federated search environment, wherein the first behavior is associated with parameters and metrics of second behavior of the first security endpoint that existed during development of the steps and variables; and
in response to the detection of the first behavior, reuse the steps and variables to perform a second search on a second security endpoint of the second federated search environment,
wherein the reusing the steps and variables to perform the second search includes iteratively executing the commands during the second search.

21. The system of claim 20, wherein the first search is performed by a threat hunting core engine (THCE) driven by threat hunting commands in a predefined threat hunting language, wherein the predefined threat hunting language includes commands for Structured Threat Information expression (STIX) patterning and normalizing the data uncovered during the first search, wherein the second search is performed by the THCE.

22. The system of claim 20, wherein the analytics run on the dataset include performing data enrichment by gathering and annotating threats within the dataset and performing clustering of data of the dataset, wherein the analytics are run on a serverless platform.

23. The system of claim 20, the logic being configured to: based on results of running the analytics, invoke a response to protect a system that interacts with the dataset, wherein invoking the response includes causing robotic response automation launching BOTs to execute commands of a playbook, wherein the playbook stores and/or defines predefined ansible scripts that perform certain actions in a coordinated environment that includes components of the system that interacts with the dataset.

24. The system of claim 23, wherein the response is selected from the group consisting of: requesting access credentials, inserting a firewall, terminating a session, powering down a server, and quarantining one or more components of a system.

25. The system of claim 20, wherein the organizing information about the first search into steps and variables includes building a threat hunting template that lists the commands iteratively executed during the first search, and the logic being configured to: store the threat hunting template in a playbook.

* * * * *